1,645,108

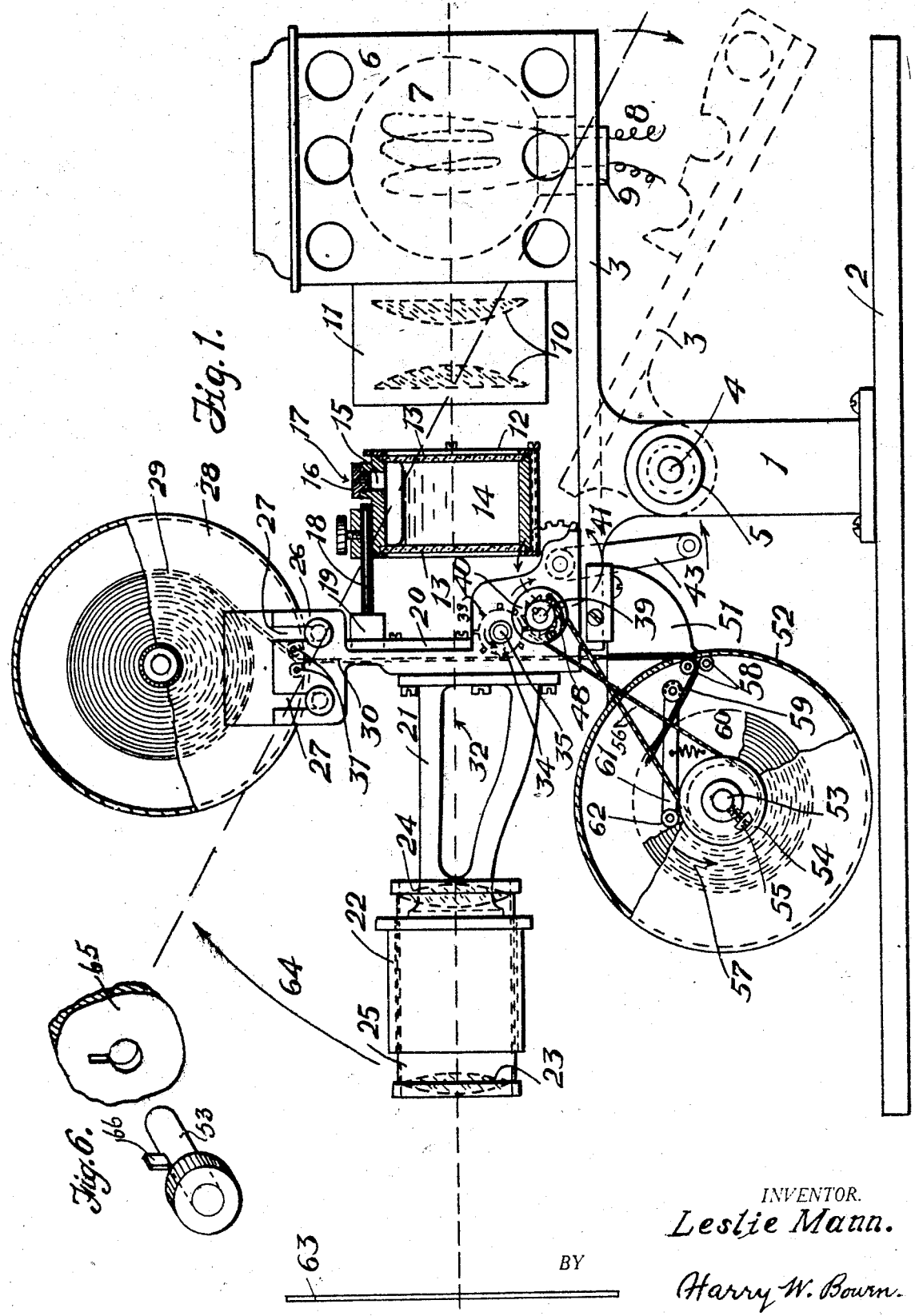

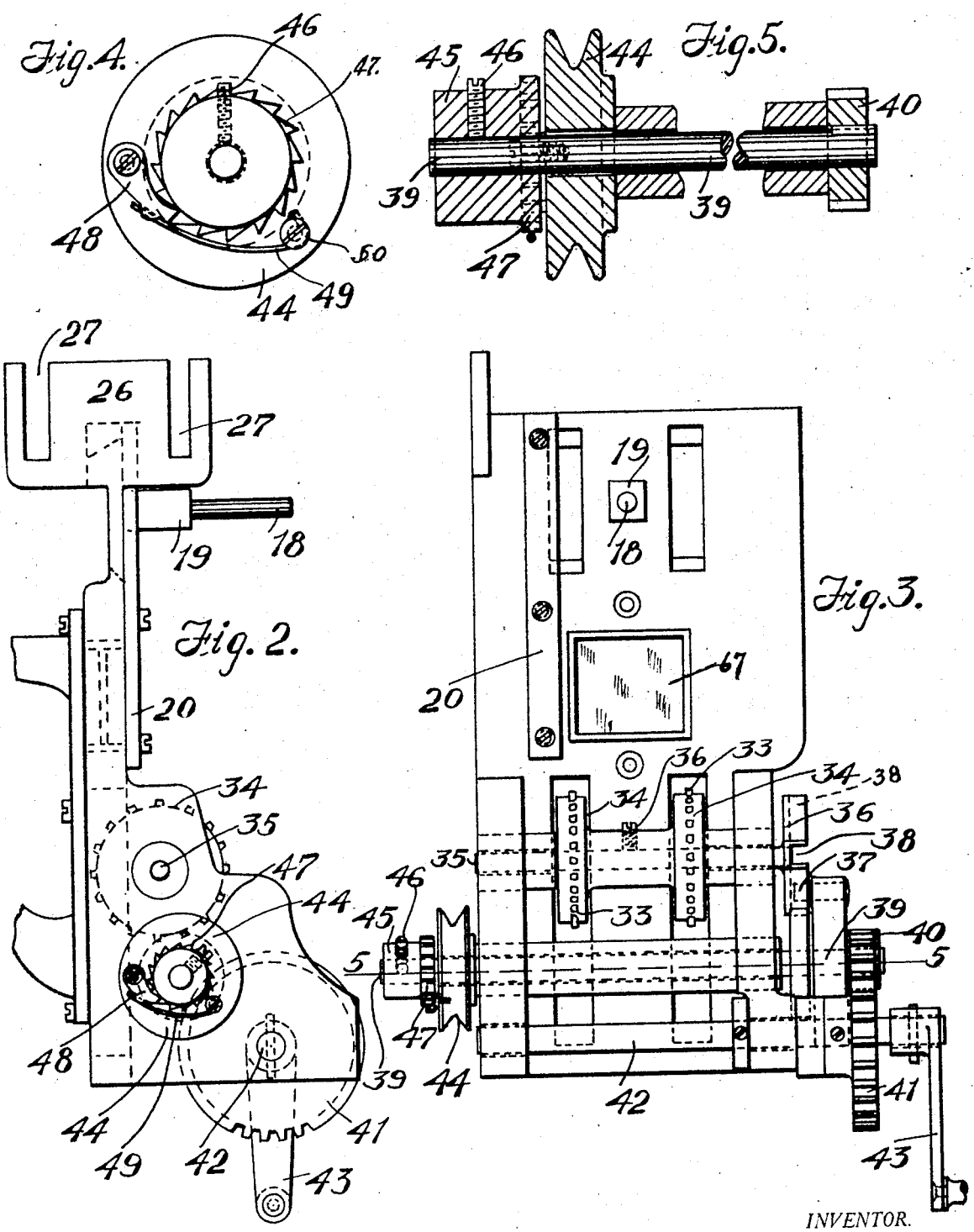

Patented Oct. 11, 1927.

UNITED STATES PATENT OFFICE.

LESLIE MANN, OF SPRINGFIELD, MASSACHUSETTS.

PROJECTOR.

Application filed July 7, 1926. Serial No. 120,945.

This invention relates to improvements in projectors for the purpose primarily of throwing pictures onto a screen for illustrating and describing how various games are to be played.

An object of the invention is to project the pictures either in a continuous or stationary manner. When the pictures on the screen are retained or held stationary the operator is then given plenty of time to thoroughly explain each play or movement shown on the screen before passing to the next one, or, if desired, the film may be reversed and any previously shown picture be thrown on the screen a second or more times for further explanation if desired. It is particularly designed for teaching purposes, particularly for showing how various games are to be played. It is, of course, not limited in its use to show how games are played.

The present invention has been developed for utilizing the screen for illustrating and describing games as the teaching of baseball and football.

A further object is in the construction of a projector which is manually operated by the person who describes the pictures. It is so constructed that the film may be operated either fast or slow, or, if desired, it may be held in a fixed position. Means is provided for preventing the film from being injured by the heat from the electric lamp. Means are further provided for focusing the pictures carefully on the screen.

An intermittent mechanism is provided for moving the film, one picture at a time, which is accomplished by means of the usual Geneva stop motion.

Referring to the drawings:

Fig. 1 is a side elevational view of the complete apparatus showing the operating mechanism for advancing the film, the tension take-up mechanism; the receptacle for preventing the heat waves from the lamp from reaching the film and means for tilting the apparatus.

Fig. 2 is an end elevational view of Fig. 3 looking from the right and illustrating the pawl and ratchet mechanism that operates to feed the film downward from the upper supply reel.

Fig. 3 is a view of Fig. 2 looking from the right showing the operating handle, the gearing for operating the Geneva stop movement, the pawl and ratchet gear on the end of the belt driving shaft, the toothed wheels which engage the openings in the film for advancing the same.

Fig. 4 is a detail view illustrating the belt receiving pulley, the shaft on which the pulley is loosely mounted and the pawl and ratchet mechanisms for operating the pulley in one direction of rotation and permitting it to slip or remain idle when the shaft is driven in the opposite direction.

Fig. 5 is a detail view on the line 5—5 of Fig. 3, and

Fig. 6 is a detail view of the connection between the shaft and film holder.

Referring to the drawings in detail:

1 designates a base or supporting member which is secured to the platform 2. 3 designates a table member that is pivotally attached to the base member 1. 4 designates a shaft for pivotally supporting the table 3 on the base member 1. 5 designates a tightening screw or hand wheel for adjustably securing the table 3 to the member 1. 6 designates as a whole the lantern part of the device having the electric bulb 7 located therein. 8 are the wires leading to a suitable source of electricity which may be readily attached to the lamp 7 in the usual way by means of the socket construction 9 which is not shown in detail. 10 designates the two usual plano-convex lens in the housing 11. Located immediately in front of the lens 10 is a cooling device 12 for absorbing the heat waves from the lamp 7. It comprises the two glass disks 13 for inclosing water indicated at 14 contained therein. A filler opening is indicated at 15 and a closure or stopper 16 formed with a vent 17. The cooling device 12 is adjustably supported by means of the rod 18 which is attached to the stationary part 19 that forms part of the main casting 20. 21 is a bracket which is secured to the casting 20. On the outer end of this bracket is a casing member 22 in which is slidably mounted the focusing and projecting lens 23 and 24 that are secured in the barrel member 25. The barrel member 25 may be easily moved in the casing member 22 for focusing purposes. The upper end of the main casting member 20 is formed with a bracket 26 having the vertical slots 27 for supporting the casing 28 in which the film roll 29 is rotatably mounted. The film that is drawn off is indicated at 30 and passes downward between the two anti-friction rollers 31, across the optical axis 32. The film is formed with the usual perforations along and near its opposite side edges to receive the projections or teeth 33 on the two wheels 34 shown in Fig. 3. The wheels 34 are secured to the shaft 35 by means of the set screw 36'. Attached at the outer end of the shaft 35 is the star wheel 36, or as it is sometimes called the Geneva stop movement wheel. 37 is a pin which is secured to the arm 37' in the shaft 39 and engages the usual cross slots 38 of the Geneva stop movement wheel. 39 is a driven shaft which extends across the machine to which is secured the pinion gear 40. 41 is a main operating gear which is rotatably mounted in the main frame work by means of the shaft 42. This gear is operated by the removable crank arm 43. 44 designates a pulley which is loosely mounted on the driven shaft 39. 45 is a collar that is secured to the shaft 39 by means of the set screw 46. This collar is formed with ratchet teeth 47. Pivotally mounted on the pulley 44 is a pawl 48. 49 is a spring that is attached at one end to the pulley 44 as indicated at 50. Its other end rests upon the pawl 48 for forcing it into engagement with the teeth 47. Attached to the forward end of the table 3 is a bracket 51 that supports the casing 52 in which the take-up reel for the film is rotatably mounted. 53 is a shaft rotatably mounted in the casing 52 and on which the take-up reel is mounted. On the shaft 53 is a pulley 54 which is secured thereto with the set screw 55. Extending from the pulley 54 is a crossed belt 56 of coiled wire under tension. It is crossed for the purpose of causing the take-up reel to rotate in the winding direction as indicated by the arrow 57. 58 are two anti-friction rollers that are located in the casing 52 and between which the film 30 passes onto the take-up reel. The tension roller 59 engages the upper surface of the film 30. The tension is applied by means of the spring 60 which is attached to the lever 61 that is pivoted to the casing 52 at 62.

The operation of the device is as follows: It is understood that the film to be exhibited is coiled up and located in the reel casing 28. It is threaded downward so that its perforations will receive the projections 33 of the wheels 34 that are attached to and operated by the shaft 35. The strand of film is passed between the rollers 58, under the tension roller 59 and onto the take-up reel in the reel casing 52. Upon operation of the crank handle 43 the gear 41 will rotate the pinion 40. This pinion will drive the shaft 39, and, through the pulleys 40 and 54, belt 56, the usual take-up reel in the casing 52 will be operated in the take up or coiling direction. At the same time, through the Geneva stop movement construction the pin 37 will alternately engage the two cross slots 38 and intermittently rotate the wheels 34 on the shaft 35. This operation will cause the film 30 to be drawn downward the distance of one picture that is to be projected onto the screen shown at 63. By means of the Geneva stop motion structure the picture is momentarily held in a stationary position on the screen 63. Further operation of the crank 43 will project the following picture or descriptive matter.

The pulley 44 is driven through the ratchet and pawl 47 and 48 in one direction. Should the crank or shaft 39 be reversed in direction the pawl 48 will loosely or idly slip over the teeth 47. This will cause the toothed wheels 34 to rotate in the opposite direction and draw the film 30 upward.

In practice it has been found that when the film 30 is moved upward instead of downward by rotating the crank arm 43 in the opposite direction, there is no need of a take up for the reel 29 since the normal elasticity of the film will of itself, coil up in the large annular space of the casing 28 between the film 29 and the inner surface of the casing 28. This space, in practice, is amply sufficient since the operator when delivering his lecture describing the views never reverses the film for only a short distance. It is to be understood that the machine is not a motion picture machine in the sense that it is continuously operated by an electric motor. It is operated manually in an intermittent motion. In other words it is an instrument that is primarily intended for use between a rapidly moving motion picture machine and a lantern or stationary picture projection machine. It is also to be understood that the present machine does not employ a shutter structure which is employed in the usual motion picture machine but only a plain piece of glass or window 67.

This operation permits the film to be turned backward and a previous picture or description thrown on the screen for further consideration.

The barrel member 22 permits accurate focusing of the picture on the screen by sliding the lenses 23 and 24 forward or backward in the casing 22. The pivotal connection 4 of the carriage 3 permits the apparatus to be tilted through a suitable angle indicated by the arrow 64. 65 designates a part of the film reel which turns with the pin 53 by means of the key 66. 67 is a window through which the picture on the film is projected.

From the description it will be seen that I have provided a projection apparatus which permits a person to thoroughly show and describe how games are to be played, and, also at the same time to operate the machine continuously or to retain the film and picture in a stationary position.

What I claim is:

1. In a picture projecting apparatus for displaying views on a film, the combination with a let off and take up film receiving reel, a Geneva stop device for intermittently moving the film from the let off to the take-up reel, means for reversing the direction of travel of the film winding reel including a shaft, a pulley which is loosely mounted on the shaft, manual means for operating the shaft, for varying the rate of travel of the film, a part secured to the shaft having ratchet teeth, a pawl which is pivotally attached to the loosely mounted pulley, means for forcing the pawl into engagement with the teeth of the part which is secured to the shaft for causing the pulley to be driven by the pawl and ratchet and to remain idle when the manually operated shaft is rotated in an opposite direction, and a belt connection between the loosely mounted pulley and the winding reel.

2. In combination, a projection device for picture films having openings, a shaft, wheels on the shaft having projections for entering the openings in the picture film, a second shaft, means for operating the shafts comprising a main gear, a pinion on the second shaft, an intermittent driving device comprising a Geneva stop motion construction between the first and second shafts, the second shaft having a pulley which is loosely mounted thereon, a collar attached to the second shaft and located close to the loose pulley and formed with ratchet teeth, a pawl carried by the loosely mounted pulley for engaging the ratchet teeth of the collar, a take-up reel, a shaft and pulley thereon for operating the reel, a belt connection between the said loose pulley and pulley on the reel shaft, the construction and arrangement being such that the film may be manually and intermittently operated in substantially a continuous manner in one direction, or, reversed in the opposite direction for permitting the operator to explain the views when the film is held stationary as desired.

3. Apparatus of the kind described comprising in combination, a film, means for intermittently operating the film, means for moving the film in opposite directions, a source of light, means located between the source of light and the film for absorbing the heat waves from the said source, a lens located on the opposite side of the film, means for varying the position of the lens for focusing the picture of the film on the screen, a take up device comprising a shaft, a pulley loosely mounted on the shaft, a pawl attached to the loosely mounted pulley, a collar formed with ratchet teeth and attached to the shaft and located close to the said pulley and engaged by the pawl of the pulley, the construction permitting the film to be rapidly or slowly moved in one direction and to be reversed and moved a short distance in an opposite direction, as described.

4. In a machine for projecting pictures on a film, comprising in combination, a base piece, a table member which is pivotally and tiltably connected to the base piece, a let off and take up reel receiving casing, reels rotatably mounted in said casings that are supported on the tiltable table, a bracket attached to the said table, focusing lenses slidably mounted on the bracket, rollers mounted in the reel receiving casing between which the film passes, a window located close to the film, between the said rollers and in the axial line of the lenses, a projecting electric bulb arranged in the axial line of the lenses and on the opposite side of the film, means below the window for drawing the film from the let off reel, connecting means from the film drawing means to the film take up reel, which permits the take up means of the film to be reversed, means for intermittently operating the film drawing means comprising a member which is attached to the film drawing means that is formed with cross grooves, a pin in the grooves, an arm to which the pin is attached, a shaft to which the arm is attached, a pinion on the arm carrying shaft, a gear meshing with the pinion on the arm carrying shaft, a gear meshing with the pinion, a shaft for supporting the gear supporting shaft for operating the gear.

LESLIE MANN.